United States Patent [19]
Kinney

[11] 3,863,757
[45] Feb. 4, 1975

[54] METHOD AND APPARATUS FOR ORIENTING ELEMENTS HAVING A CONCAVE PORTION

[75] Inventor: Alfred W. Kinney, Kansas City, Mo.

[73] Assignee: Phillips Petroleum Company, Bartlesville, Okla.

[22] Filed: May 9, 1973

[21] Appl. No.: 358,533

[52] U.S. Cl.................. 198/271, 198/275, 221/157
[51] Int. Cl............................................ B65g 47/24
[58] Field of Search........ 198/33 AA, 33 R, 33 AD, 198/271, 275; 221/157, 167; 193/43 R, 43 C

[56] References Cited
UNITED STATES PATENTS

| | | | |
|---|---|---|---|
| 831,905 | 4/1905 | Thom............................ | 198/33 AA |
| 1,945,888 | 2/1934 | Fields............................ | 198/33 AD |
| 2,364,243 | 12/1944 | Riddle, Jr. .................... | 221/157 |
| 3,049,216 | 8/1962 | Campbell...................... | 198/33 AA |
| 3,067,852 | 12/1962 | Barr............................... | 198/33 AA |
| 3,086,639 | 4/1963 | Donofrio....................... | 198/33 AA |
| 3,365,048 | 1/1968 | Ehrlich et al. ................ | 198/33 AA |
| 3,451,524 | 6/1969 | Normandin.................... | 198/33 AD |
| 3,526,311 | 9/1970 | Robinson....................... | 198/33 AD |
| 3,570,642 | 3/1971 | Shenoha........................ | 198/33 AA |
| 3,726,385 | 4/1973 | Sterling......................... | 198/33 AA |

FOREIGN PATENTS OR APPLICATIONS

| | | | |
|---|---|---|---|
| 739,285 | 7/1966 | Canada.......................... | 198/33 AA |
| 775,652 | 5/1957 | Great Britain................. | 198/33 AA |

*Primary Examiner*—Evon C. Blunk
*Assistant Examiner*—Richard K. Thomson

[57] ABSTRACT

A method and apparatus for positioning concave articles on an upwardly moving elevator with the articles resting on a side portion thereof, moving the articles upwardly with the elevator, contacting a portion of the articles with a rotatable wheel positioned adjacent the elevator, moving the articles from the elevator to a commonly oriented position at one of first or second locations, and moving the commonly oriented articles from the first and second locations to a preselected location.

15 Claims, 5 Drawing Figures

METHOD AND APPARATUS FOR ORIENTING ELEMENTS HAVING A CONCAVE PORTION

It is desirable to provide an apparatus for removing concave articles, such as lids having sidewall portions, from a concave article bulk source where said articles reside in random orientation and delivering said lids to a preselected location in commonly oriented positions. By the term lids used herein it is meant any article having side portions and a top portion defining an article having at least one concave portion.

Other aspects, objects, and advantages of the present invention will become apparent from a study of the disclosure, the appended claims, and the drawings.

The drawings are diagrammatic views of the apparatus of this invention.

Figure 2:
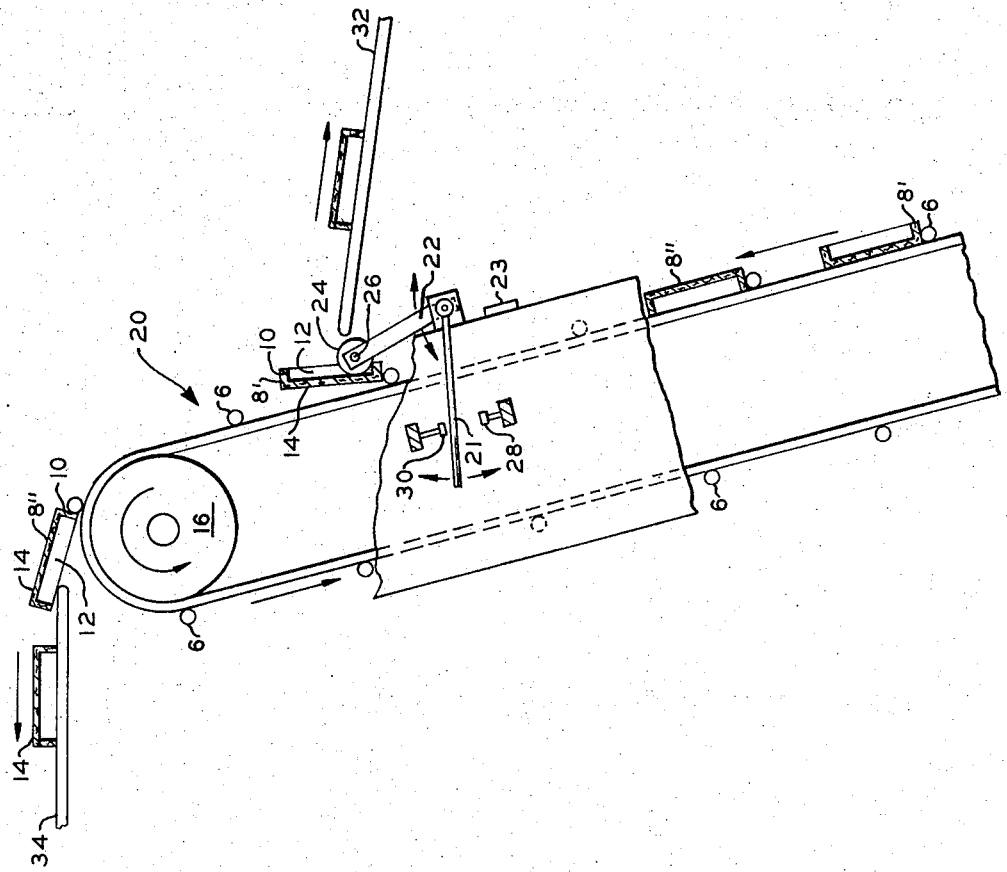
FIG. 2 shows a view of the upper portion of the elevator with portions of the chutes cut away.
Figure 1:
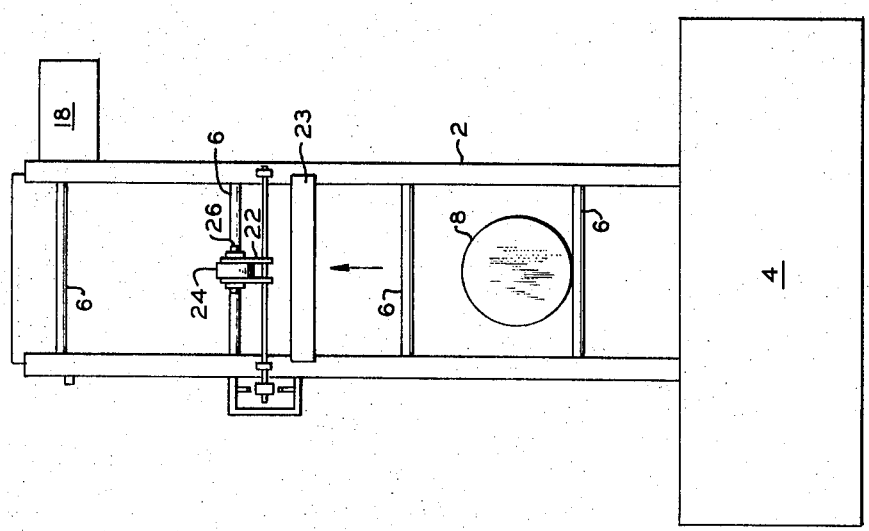
FIG. 1 is a portion of the apparatus with the first and second chutes removed.
Figure 3:
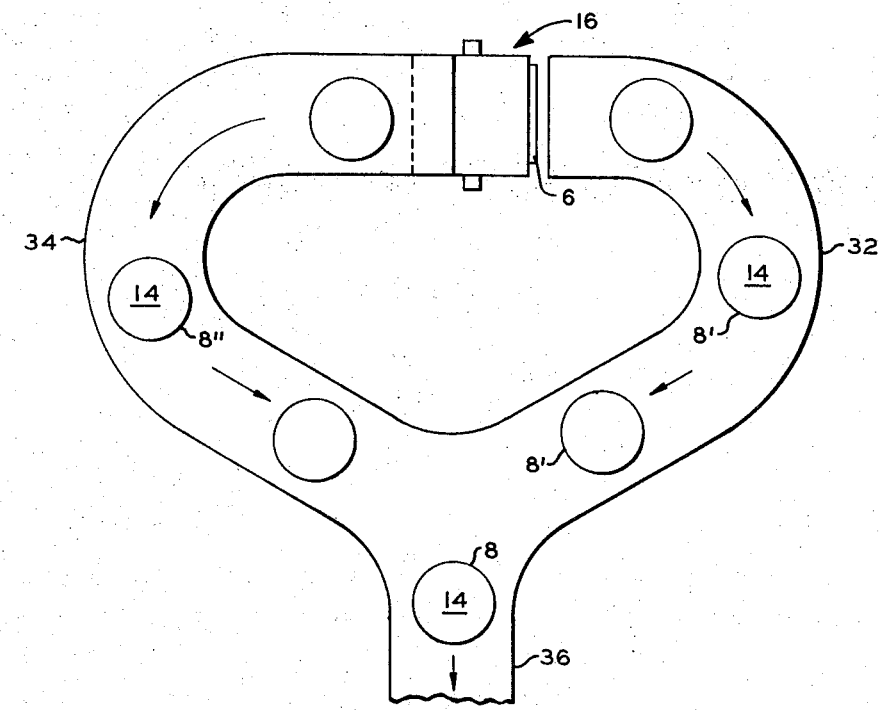
FIG. 3 shows a plan view of the apparatus with the hopper removed.

Referring to FIGS. 1, 2, and 3, an elevator 2 extends upwardly from within an article hopper 4. The elevator 2 has spaced-apart cross members 6 positioned along its length for receiving and supporting the lids 8 and moving said lids 8 upwardly. The cross members 6 are of dimensions adapted to receive and maintain a lid 8 with said lid 8 resting on a side portion 10 thereof. A lid 8 resting on one of the cross members is oriented relative to the elevator 2 with its concave portion 12 directed toward or from the elevator 2.

Where the articles or lids 8 are ice cream caps, for example, the top 14 and side portions 10 of the lid define the concave portion 12.

The cross members 6 are spaced one from the other a distance in the range of about 2 to about 1 times the diameter or largest dimension of the top 14 of the article or lid 8 carried by the elevator 2, preferably about 1⅓ times. At distances less than about 1⅓ times the dimension of the top 14, the lids 8 are not effectively fed into the elevator and dimensions greater than about 2 times the dimension of the top 14 result in jamming of the articles, waste of elevator space, materials, and the operating speed of the apparatus is reduced which results in further obvious wastes.

In order to assure that the lids 8 remain on their cross member 6 during upward movement thereby, it is preferred that the elevator be inclined at an angle in the range of about 5° to about 15° relative to the vertical in a direction whereby gravity urges the lids 8 resting on the cross members 6 toward the elevator 2. At angles less than about 5°, the lids 8 are more prone to be displaced from the elevator by vibrational forces and at angles greater than about 15°, the lids 8 are sufficiently difficult to orient as to cause undesirable malfunctions of the apparatus.

A drive pulley 16 of the elevator 2 is operably connected to a power source 18 for rotation of the pulley 16 and moving the cross member 6 and is positioned adjacent an upper end portion 20 of the elevator 2.

At least one pivot arm 22 having a contacting wheel 24 rotatably connected thereto, for example by a shaft 26 traversely positioned relative to the elevator 2 and being connected to first ends of a pair of pivot arms, is positioned adjacent the elevator 2. The pivot arm 22 is pivotally disposed at the second end thereof at a lower elevation than said wheel 24 for pivotal movement of the wheel 24 toward and from the elevator 2.

The wheel 24 and pivot arm 22 are preferably positioned relative to the elevator 2 such that the wheel 24 is urged by counterbalance arm 21 in a direction toward the elevator 2. Stop lugs 28, 30 can be positioned on opposed sides of the counterbalance arm 21 for limiting the pivotal movement of pivot arm 22.

A first chute 32 is positioned adjacent the wheel 24 and extends outwardly from the elevator 2. A second chute 34 is positioned adjacent the drive pulley 16 at the upper end of the elevator 2 and extends outwardly from the elevator 2.

Referring to FIG. 3, a third chute 36 can be connected to the first and second chutes 32, 34 for receiving lids 8', 8'' therefrom and directing said lids to a preselected location such as, for example a capping machine. The third chute 36 can also have apparatus (not shown) associated therewith for diverting any excess lids resting on the third chute 36 back to said hopper 4. This diverting apparatus is a safety feature which effectively handles excess lids when the capping machine has malfunctioned, for example.

Figure 4:
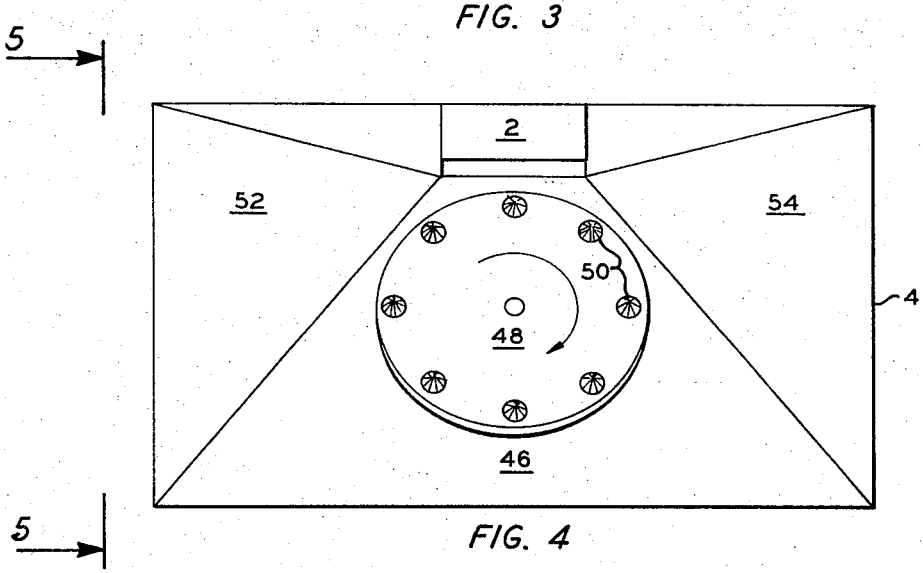
FIG. 4 shows a plan view of the hopper.
Figure 5:
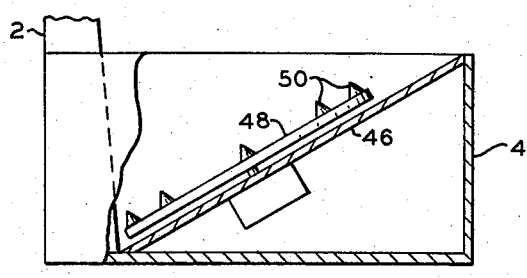
FIG. 5 shows a side view of the hopper in partial section.

Referring to FIGS. 4 and 5, in order to provide a hopper 4 of a configuration which reduces the amount of jamming and bridging of disoriented lids 8 therein while feeding the lids 8 toward the elevator 2 for deposit thereon, the bottom 46 of the hopper is positioned in the hopper at an angle relative to the horizontal in the range of about 30° to about 45° and extending downwardly toward the elevator 2. At angles less than about 30°, the lids 8 are not effectively moved by gravity toward the elevator and at angles greater than about 45°, the amount of interlocking, bridging, and feeding malfunctions are increased owing to the weight of the overlying lids 8 and the lid direction change that must be effected.

In order to further assure against bridging, interlocking, and other feeding malfunctions, it is preferred that an unscrambling rotatable element 48 having protrusions 50 extending outwardly into the hopper 4 form at least a portion of the hopper bottom 46 and said element 48 be rotatable for moving the protrusions 50 within the hopper 4. The protrusions 50 are preferably spaced apart and may be of conical configuration for protecting the lids 8 against damage during contact with the protrusions 50.

In order to further assure effective feeding of lids 8 to the elevator 2, it is preferred that first and second side elements 52, 54 by angularly positioned in the hopper 4 relative to the elevator 2 with one end of said elements 52, 54 being adjacent the elevator 2 on opposed sides thereof with each of said elements 52, 54 extending angularly outwardly in the hopper 4 from the elevator 2.

In the preferred method of this invention, lids 8 in the hopper 4 are positioned on the cross member 6 with the concave portion of some lids oriented in a direction from the elevator and some lids with their concave portion oriented in a direction toward the elevator and moved upwardly in response to the upward movement of the cross member 6. As the lids 8' and 8'' pass the wheel 24, they are prevented from pivoting on their front edge by cross bar 23. Said wheel rolls over the lids 8' which are oriented with the concave portion in a direction from the elevator and pivots said lids about their lower edge from the elevator onto the first chute 32 in a commonly oriented position. Lids 8" with their concave portion oriented toward the elevator are contacted by the wheel 24 but are not pivoted on the first chute 24 owing to the fact that the wheel 24 cannot enter the recess. To the contrary, the wheel 24 rolls over lids 8" without displacing them onto the first chute 32. Lids 8" thereafter travel upwardly and are deposited on the second chute 34 with the recessed portion 12 directed toward the portion of the second chute 34 supporting said lid 8''.

The side elements 52, 54 cause the lids to be directed toward the elevator 2 and the unscrambling element 48 continuously moves at least a portion of the lids 8 in the hopper 4 adjacent the elevator 2 for assuring proper feeding of the lids 8 to the elevator 2.

The power source connected to the elevator 2, unscrambling element 48, and drum 16 can be a single power source or separate power sources as is known in the art.

Other modifications and alterations of this invention will become apparent to those skilled in the art from the foregoing discussion and accomapnying drawings, and it should be understood that this invention is not to be unduly limited thereto.

What is claimed is:

1. An apparatus for recovering articles having a concave portion defined by a top and a side portion from a bulk source, orienting said articles with the concave portion of said articles directed downwardly and delivering said oriented articles to a preselected location, comprising:
    first means for receiving articles from the bulk source, maintaining each individual article resting on its side portion against the supporting structure of the first means, and moving said article upwardly;
    second means for receiving from the upper end of the first means an article having its concave portion directed toward the supporting structure of the first means and moving the article from the first means to preselected location, retaining the position of the concave portion of the article directed toward the structure supporting the article on the second means and at the preselected location;
    third means for contacting an oriented article supported by said first means, pivoting outwardly from the first means and onto a fourth means for receiving and moving only an article having its concave portion directed outwardly from the supporting structure of the first means, said pivoted article being pivoted about its side portion; and
    fourth means for receiving and moving to a preselected location an article pivoted from the first means by the third means, said pivoted article positioned on the fourth means and at the preselected location having its concave portion directed toward the structure supporting said article.

2. An apparatus, as set forth in claim 1, wherein the third means comprises:
    a rotatable contacting wheel; and
    at least one pivot arm connected to the wheel at one end and pivotally disposed at the other end adjacent the first means at a lower elevation that said wheel for pivotal movement of the wheel toward and from the first means.

3. An apparatus, as set forth in claim 2, wherein the wheel is urged by a counterbalance arm in a direction toward the first means.

4. An apparatus, as set forth in claim 2, including means for limiting the pivotal movement of the wheel.

5. An apparatus, as set forth in claim 2, including a shaft having the wheel rotatably mounted thereon with said shaft traversely positioned relative to the first means and being connected at opposed ends to a separate pivot arm.

6. An apparatus, as set forth in claim 3, wherein said article bulk source comprises an article hopper positioned about a lower end portion of the first means.

7. An apparatus, as set forth in claim 6, including an unscrambling element having protrusions extending outwardly therefrom, said unscrambling element being angularly disposed in the hopper relative to the first means and rotatable for moving the protrusions within the hopper.

8. An apparatus, as set forth in claim 7, wherein the unscrambling element is positioned in the hopper at an angle relative to the horizontal in the range of about 30° to about 45°.

9. An apparatus, as set forth in claim 7, wherein the protrusions of the unscrambling element are of conical configuration and are spaced on the unscrambling element one from the other.

10. An apparatus, as set forth in claim 6, including side elements being angularly disposed in the hopper relative to the first means with one end of each element being adjacent the first means on opposed sides thereof with each of said elements extending angularly outwardly in the hopper from the first means.

11. An apparatus, as set forth in claim 1, wherein the first means has spaced-apart cross members along its length for supporting the articles thereon, said cross members being spaced one from the other a distance in the range of about 2 to about 1 times the diameter of the top of the article carried by said first means.

12. An apparatus, as set forth in claim 1, wherein the first means inclined at an angle in the range of about 5° to about 15° relative to the vertical.

13. A method for recovering articles having a concave portion defined by a top and a side portion from a bulk source and orienting and delivering said articles to a preselected location, comprising:
    receiving articles from the bulk source, maintaining individual, spaced articles each article resting on its side portion, and moving each article on an upwardly moving supporting structure;
    receiving from the top of the upwardly moving supporting structure and moving to a preselected location only an article having its concave portion directed in a first direction, said article having its concave portion directed in a first direction, said article having its concave portion directed toward the structure supporting said article on the upwardly moving support structure at and during movement to said preselected location;
    contacting an article having its concave portion directed away from the upwardly moving supporting structure and pivoting the article into a position having its concave portion directed toward the supporting structure of a means for receiving and moving the pivoted article to a preselected location; and receiving the pivoted article on a means for moving said pivoted article to a preselected location and moving the pivoted article to a preselected location, said pivoted article having its concave portion directed toward the structure supporting the article at and during movement to said preselected location.

14. A method, as set forth in claim 13, including continuously moving at least a portion of the articles in the article bulk source.

15. A method, as set forth in claim 13, including directing the articles of the article bulk source in a preselected direction.

* * * * *

UNITED STATES PATENT OFFICE
CERTIFICATE OF CORRECTION

PATENT NO. : 3,863,757
DATED : February 4, 1975
INVENTOR(S) : Alfred W. Kinney

It is certified that error appears in the above-identified patent and that said Letters Patent are hereby corrected as shown below:

Column 3, line 67, "that" should be -----than-----

Column 4, line 44, after "means" insert -----is-----

Column 4, lines 58 & 59, delete "in a first direction, said article having its concave portion directed"

Signed and sealed this 20th day of May 1975.

(SEAL)
Attest:

RUTH C. MASON
Attesting Officer

C. MARSHALL DANN
Commissioner of Patents
and Trademarks